United States Patent

Rombach et al.

[11] Patent Number: 5,412,983
[45] Date of Patent: May 9, 1995

[54] DEVICE FOR DETERMINING THE FLOW VELOCITY AND FLOW DIRECTION OF GASES OR LIQUIDS

[75] Inventors: Martin Rombach; Manfred Streicher, both of Lenzkirch, Germany

[73] Assignee: Testo GmbH & Co., Lenzkirch, Germany

[21] Appl. No.: 214,413

[22] Filed: Mar. 18, 1994

[30] Foreign Application Priority Data

Mar. 19, 1993 [DE] Germany .................. 43 08 877.5

[51] Int. Cl.⁶ ................ G01F 1/68; G01P 5/12
[52] U.S. Cl. ................ 73/170.12; 73/204.22
[58] Field of Search ........ 73/204.21, 204.22, 204.25, 73/204.27, 170.11, 170.12

[56] References Cited

U.S. PATENT DOCUMENTS

| 2,255,771 | 9/1941 | Golay | 73/170.12 |
| 2,314,877 | 3/1943 | Hall | 73/204.22 |
| 2,926,299 | 2/1960 | Rogoff | 73/204.27 |
| 3,246,515 | 4/1966 | Martino et al. | 73/204.27 |
| 4,537,068 | 8/1985 | Wrobel et al. | |

FOREIGN PATENT DOCUMENTS

| 1224546 | 9/1966 | Germany . | |
| 1241170 | 5/1967 | Germany . | |
| 1623931 | 2/1971 | Germany . | |
| 2218278 | 10/1973 | Germany . | |
| 538299 | 12/1976 | U.S.S.R. | 73/170.12 |
| 1147983 | 3/1985 | U.S.S.R. | 73/204.21 |

OTHER PUBLICATIONS

Testoterm GmbH & Co., "Testovent 4000/4300/4100/4200", Flügelrad–Anemometer, May, 1986.
G. F. Pennell, M. D. Plucinski and R. Varmha, "Air–Flow Direction Sensor", IBM Technical Disclosure Bulletin, vol. 25, No. 3B, Aug., 1982.

*Primary Examiner*—Herbert Goldstein
*Attorney, Agent, or Firm*—Popham, Haik, Schnobrich & Kaufman, Ltd.

[57] ABSTRACT

The flow velocity of the medium is determined with the aid of a temperature-dependent resistor. The measurement probe is located in a partially open measurement chamber. The measurement chamber has an inlet port and an outlet port of different sizes. Only if the flow enters through the smaller inlet port and exits through the larger outlet port, is the actual flow velocity measured. When the flow enters through the outlet port, the measured value is less by about 30%. From this difference the direction of flow can be clearly determined.

18 Claims, 1 Drawing Sheet

DEVICE FOR DETERMINING THE FLOW VELOCITY AND FLOW DIRECTION OF GASES OR LIQUIDS

The invention relates to a device for determining the flow velocity and flow direction of gases or liquids.

There exists from the prospectus of the applicant (Testovent p. 86/2) a device, with which only the magnitude of the flow velocity of gases can be measured with the aid of a temperature-dependent resistor, which serves as a measuring probe and which is attached to the tip of a holding pipe within a partially opened measurement chamber. The drawback of this device is that the flow direction cannot be determined with said device.

There exists from the DE 2 218 278 A1 a device for determining the flow velocity and flow direction of gases and liquids with the aid of temperature-dependent resistors. In so doing, the temperature-dependent resistor is located in a chamber, which is open on one side and through which said medium does not flow and thus presents significant resistance for the flow, a state that results in turbulence and allows only inaccurate measurement. In addition, the reaction time with this method of measurement is relatively long.

The object of the invention is to provide a device for determining the flow velocity and flow direction of gases and liquids; said device is to be simple and inexpensive to manufacture, is to have a minimum effect on the flow and a short reaction time.

According to the present invention, a device for determining the flow velocity and flow direction of gases or liquids includes a holding pipe and a hollow, substantially cylindrical, pipe segment having a longitudinal axis and attached to the end of the holding pipe. The hollow substantially cylindrical pipe segment is rotatable about the axis and has two opposing ports located in the pipe segment near an end thereof. A temperature-dependent resistor is used as a measurement probe and is positioned in an interior portion of the pipe segment between the ports. The ports have different cross-sectional areas.

The two ports can be ovals that extend parallel to the axis. The two ports can also have an identical length in a direction parallel to the axis but a different length in a direction perpendicular to the axis. The port having a smaller cross-sectional area can serve as an inlet port for the flow. The device can also include a protective sleeve which can be moved along the axis to a limited degree and which rests form-closed against the pipe segment to cover the ports when not in use. The device can also include a marking affixed to the holding pipe to indicate the direction of flow.

The invention is explained in detail with reference to one embodiment depicted in the drawings.

Figure 1:
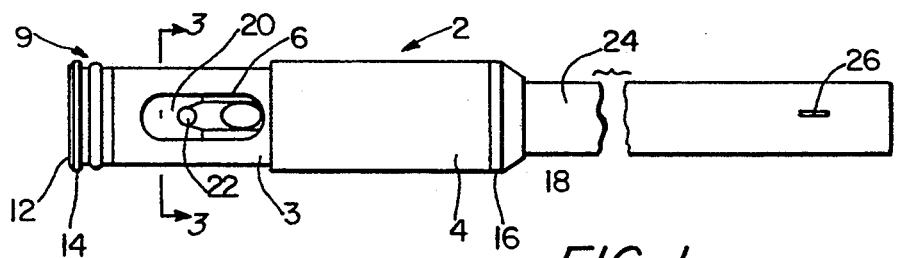
FIG. 1 is a side view of a probe head according to the invention.

The probe head 2 comprises in essence a pipe segment 3, whose one end is closed with a cover 12, which is put on, cemented, or preferably screwable, and whose other end exhibits a conical coupling 18. An inlet port 6 runs parallel to the longitudinal axis of the pipe segment 3 near the closed end. On the opposite side to the pipe segment 3 there is an outlet port 7. The longitudinal extensions of the inlet port 6 and outlet port 7 are in essence the same; the cross extension of the outlet port is greater than that of the inlet port. A protective sleeve 4, which is half as long as the entire pipe segment 3, sits on the pipe segment 3 so as to be axially moveable. The cover stop 14 and the coupling stop 16, which limit the displacement path of the protective sleeve 4, have approximately the same diameter as the protective sleeve 4. The cover 12 has a peripheral groove, into which a sealing ring 10 is inserted. A rod 24, whose end carries a temperature-sensitive resistor 22, runs through the open coupling 18. The resistor 22 is advantageously a NTC resistor, which sits in a glass bead.

Figure 2:
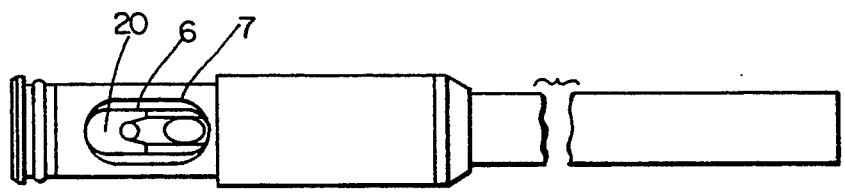
FIG. 2 is a side view according to FIG. 1, but rotated by 180° around the longitudinal axis of the probe head.

FIG. 2 is a side view of the probe head according to FIG. 1; said view is rotated 180° around the axis of the pipe segment 3. The inside region of the pipe segment 3 between the inlet and outlet port 6, 7 forms the measurement chamber 20. The resistor 22 projects as far as the center of the measurement chamber 20.

Figure 3:
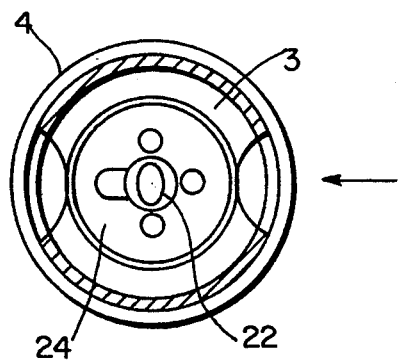
FIG. 3 is a sectional view along line A—A according to FIG. 1.

FIG. 3 is an enlarged sectional view perpendicular to the longitudinal axis of the pipe segment 3 along the line A—A according to FIG. 1. The arrow shows the direction of flow.

The method by which the device functions is described in detail in the following.

The probe head 2 is held into the flow to be measured.

When the protective sleeve 4 is retracted, the inlet port 6 and the outlet port 7 are open.

Figure 4:
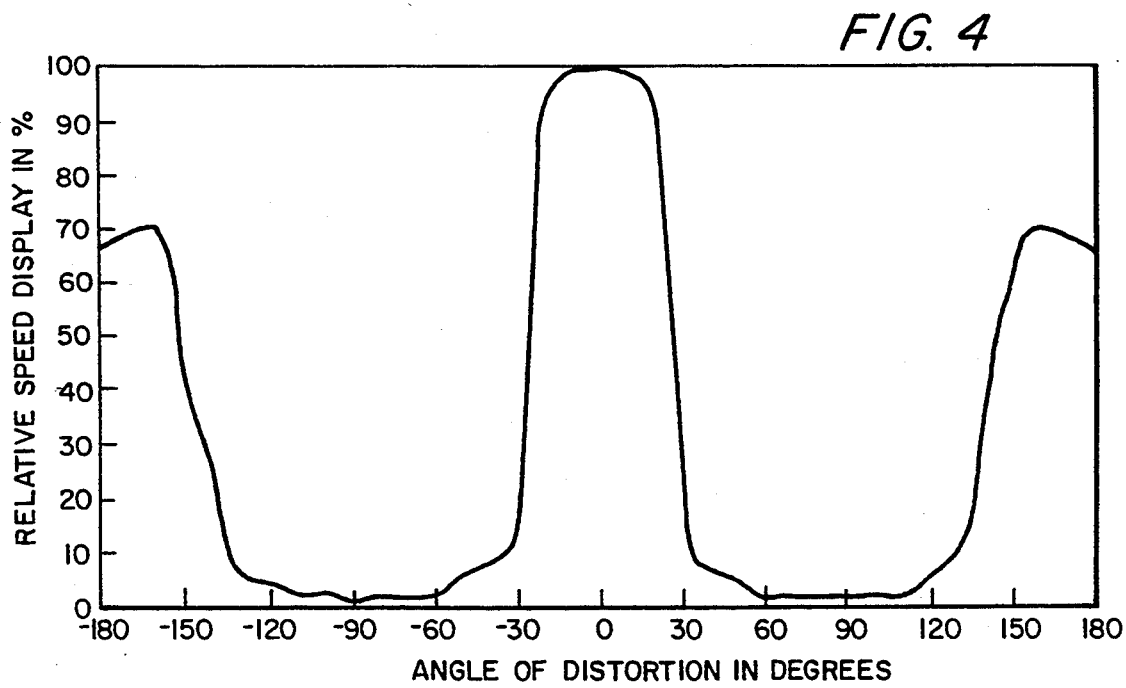
FIG. 4 is a measurement graph.

The gas or the liquid flows through the inlet port 6 into the measurement chamber 20. Through the outlet port 7 the flow emerges again from the measurement chamber 20. On its way through the measurement chamber 20 the gas or liquid current flows around the resistor 22 and contributes to its cooling. The amount of cooling is a measurement for the flow velocity. Said flow velocity is determined electronically by way of the resistance value of the resistor 22 and is indicated by means of a measuring device (not illustrated in the drawing). Since the inlet port 6 and outlet port 7 exhibit different cross sections, the amount of the measured value is a function of the direction of the incoming flow. If the flow enters through the inlet port 6 and exits through the outlet port 7, a measured value is obtained that corresponds directly to the flow velocity, since the measurement device is calibrated for this direction of incoming flow. If under these conditions the probe head 2 is rotated by 180° around its longitudinal axis, so that the outlet port 7 faces the flow, the result is a measured value that is smaller by, e.g., 30%. In the angular range between 60° and 120° the measured value goes to zero, e.g. to a measured value below 5%. The measured value assumes at 0° and 180° a local maximum, as illustrated by the curve according to FIG. 4.

The direction of flow is determined in the following manner.

The probe head 2 put into the flowing medium is oriented in such a manner that the measured value assumes an absolute maximum. In this position of the probe head 3 the inlet port 7 faces the flow and the measured value corresponds to the flow velocity. At this stage the direction of flow can also be read by means of a marking 26 on the holding pipe. Following measurement, the protective sleeve 4 is moved over the ports 6 or 7, in order to protect the measurement probe from soiling and damages.

We claim:

1. Device for determining the flow velocity and flow direction of gases or liquids, comprising:
   a holding pipe;
   a hollow substantially cylindrical pipe segment having a longitudinal axis, said pipe segment being attached to an end of said holding pipe and being rotatable about said axis;
   two opposing ports, located on said pipe segment near an end thereof; and
   a temperature-dependent resistor used as a measurement probe and positioned in an interior portion of said pipe segment between said ports, wherein the ports have different cross-sectional areas.

2. Device as claimed in claim 1, wherein the two ports are oval and extend parallel to said axis.

3. Device as claimed in claim 2, wherein the two ports have an identical length in a direction parallel to said axis, but a different length in a direction perpendicular to said axis.

4. Device as claimed in claim 2, wherein the port having a smaller cross-sectional area serves as an inlet port for the flow.

5. Device as claimed in claim 2, wherein a protective sleeve, which can be moved along said axis to a limited degree, rests form-closed against the pipe segment.

6. Device as claimed in claim 1, wherein the two ports have an identical length in a direction parallel to said axis, but a different length in a direction perpendicular to said axis.

7. Device as claimed in claim 6, wherein the port having a smaller cross-sectional area serves as an inlet port for the flow.

8. Device as claimed in claim 6, wherein a protective sleeve, which can be moved along said axis to a limited degree, rests form-closed against the pipe segment.

9. Device as claimed in claim 8, wherein a protective sleeve, which can be moved along said axis to a limited degree, rests form-closed against the pipe segment.

10. Device as claimed in claim 1, wherein the port having a smaller cross-sectional area serves as an inlet port for the flow.

11. Device as claimed in claim 10, wherein a protective sleeve, which can be moved along said axis to a limited degree, rests form-closed against the pipe segment.

12. Device as claimed in claim 1, wherein a protective sleeve, which can be moved along said axis to a limited degree, rests form-closed against the pipe segment.

13. Device as claimed in claim 1, wherein a marking affixed to the holding pipe indicates the direction of flow.

14. Device as claimed in claim 13, wherein the two ports have an identical length in a direction parallel to said axis but a different length in a direction perpendicular to said axis.

15. Device as claimed in claim 14, wherein the port having a smaller cross-sectional area serves as an inlet port for the flow.

16. Device as claimed in claim 15, wherein a protective sleeve, which can be moved along said axis to a limited degree, rests form-closed against the pipe segment.

17. Device as claimed in claim 13, wherein the port having a smaller cross-sectional area serves as an inlet port for the flow.

18. Device as claimed in claim 13, wherein a protective sleeve, which can be moved along said axis to a limited degree, rests form-closed against the pipe segment.

* * * * *